US007149359B1

(12) United States Patent
Omoigui

(10) Patent No.: US 7,149,359 B1
(45) Date of Patent: Dec. 12, 2006

(54) SEARCHING AND RECORDING MEDIA STREAMS

(75) Inventor: Nosakhare D. Omoigui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/465,530

(22) Filed: Dec. 16, 1999

(51) Int. Cl.
*G06K 9/68* (2006.01)
*G06F 15/00* (2006.01)
*G06K 9/00* (2006.01)

(52) U.S. Cl. .................... 382/219; 345/302
(58) Field of Classification Search ............ 715/500.1, 715/501.1; 709/231, 203; 345/723, 302; 707/3; 382/218–220, 305
See application file for complete search history.

(56) References Cited

U.S. PATENT DOCUMENTS

| | | | |
|---|---|---|---|
| 4,931,950 A | 6/1990 | Isle et al. ................. 364/513 |
| 5,050,161 A | 9/1991 | Golestani .................. 370/60 |
| 5,119,474 A | 6/1992 | Beitel et al. .............. 395/154 |
| 5,136,655 A * | 8/1992 | Bronson .................... 704/270 |
| 5,274,758 A | 12/1993 | Beitel et al. .............. 395/154 |
| 5,309,562 A | 5/1994 | Li ............................ 395/200 |
| 5,313,454 A | 5/1994 | Bustini et al. .............. 370/13 |
| 5,341,474 A | 8/1994 | Gelman et al. ............ 395/200 |
| 5,414,455 A | 5/1995 | Hooper et al. ................ 348/7 |
| 5,434,848 A | 7/1995 | Chimento, Jr. et al. ..... 370/17 |
| 5,455,910 A | 10/1995 | Johnson et al. ............ 395/650 |
| 5,481,542 A | 1/1996 | Logston et al. ............ 370/94.2 |
| 5,490,252 A | 2/1996 | Macera et al. ......... 395/200.01 |
| 5,504,744 A | 4/1996 | Adams et al. ............ 370/60.1 |
| 5,519,701 A | 5/1996 | Colmant et al. .......... 370/60.1 |
| 5,521,630 A | 5/1996 | Chen et al. ................... 348/7 |
| 5,533,021 A * | 7/1996 | Branstad et al. .......... 370/60.1 |
| 5,535,063 A * | 7/1996 | Lamming ..................... 360/4 |
| 5,537,408 A | 7/1996 | Branstad et al. ............. 370/79 |
| 5,541,955 A | 7/1996 | Jacobsmeyer ............... 375/222 |
| 5,559,942 A | 9/1996 | Gough et al. .............. 395/155 |
| 5,566,175 A | 10/1996 | Davis ......................... 370/84 |
| 5,574,724 A | 11/1996 | Bales et al. ............... 370/68.1 |
| 5,614,940 A | 3/1997 | Cobbley et al. .............. 348/7 |
| 5,617,423 A | 4/1997 | Li et al. .................... 370/426 |
| 5,623,690 A | 4/1997 | Palmer et al. ............. 395/806 |
| 5,625,405 A | 4/1997 | DuLac et al. ................. 348/7 |
| 5,640,320 A | 6/1997 | Jackson et al. ............ 364/192 |
| 5,664,227 A | 9/1997 | Mauldin et al. ........... 395/778 |
| 5,692,213 A | 11/1997 | Goldberg et al. .......... 395/806 |
| 5,717,691 A | 2/1998 | Dighe et al. ............... 370/401 |
| 5,717,869 A | 2/1998 | Moran et al. .............. 395/339 |
| 5,719,786 A | 2/1998 | Nelson et al. ............. 364/514 |
| 5,721,829 A | 2/1998 | Dunn et al. ............ 395/200.49 |
| 5,742,347 A | 4/1998 | Kandlur et al. ............ 348/426 |
| 5,768,533 A | 6/1998 | Ran ..................... 395/200.77 |

(Continued)

FOREIGN PATENT DOCUMENTS

EP 0605115 7/1994

(Continued)

OTHER PUBLICATIONS

Eric Ladd et al., Using HTML 4, XML, and Java 1.2 (Que: Dec. 1998), p. 690.*

(Continued)

*Primary Examiner*—Amir Alavi
(74) *Attorney, Agent, or Firm*—Lee & Hayes, PLLC

(57) ABSTRACT

In a networked client/server system, media data is streamed from a server to a client. A user of the client can search the media data to identify portions that satisfy certain search criteria, and/or store the media data locally at the client for subsequent playback.

47 Claims, 8 Drawing Sheets

U.S. PATENT DOCUMENTS

| | | | |
|---|---|---|---|
| 5,786,814 A | 7/1998 | Moran et al. | 345/328 |
| 5,794,210 A | 8/1998 | Goldhaber et al. | 705/14 |
| 5,794,249 A | 8/1998 | Orsolini et al. | 707/104 |
| 5,799,292 A | 8/1998 | Hekmatpour | 706/11 |
| 5,801,685 A | 9/1998 | Miller et al. | 345/302 |
| 5,808,662 A | 9/1998 | Kinney et al. | 348/15 |
| 5,818,510 A | 10/1998 | Cobbley et al. | 348/7 |
| 5,819,286 A * | 10/1998 | Yang et al. | 707/1 |
| 5,822,537 A | 10/1998 | Katseff et al. | 395/200.61 |
| 5,828,848 A | 10/1998 | MacCormack et al. | 395/200.77 |
| 5,835,495 A | 11/1998 | Ferriere | 370/465 |
| 5,835,667 A | 11/1998 | Wactlar et al. | 386/96 |
| 5,838,906 A | 11/1998 | Doyle et al. | 395/200.32 |
| 5,859,641 A | 1/1999 | Cave | 345/348 |
| 5,864,682 A | 1/1999 | Porter et al. | 395/200.77 |
| 5,870,755 A | 2/1999 | Stevens et al. | 707/104 |
| 5,873,735 A | 2/1999 | Yamada et al. | 434/316 |
| 5,892,506 A | 4/1999 | Hermanson | 345/302 |
| 5,903,673 A | 5/1999 | Wang et al. | 382/236 |
| 5,918,002 A | 6/1999 | Klemets et al. | 395/182.16 |
| 5,930,493 A * | 7/1999 | Ottesen et al. | 725/92 |
| 5,930,787 A | 7/1999 | Minakuchi et al. | 707/4 |
| 5,953,506 A | 9/1999 | Kalra et al. | 395/200.61 |
| 5,956,716 A | 9/1999 | Kenner et al. | 707/10 |
| 5,973,679 A * | 10/1999 | Abbott et al. | 715/500.1 |
| 5,983,236 A * | 11/1999 | Yager et al. | 707/104.1 |
| 5,995,941 A | 11/1999 | Maquire et al. | 705/10 |
| 5,999,979 A | 12/1999 | Vellanki et al. | 709/232 |
| 6,006,241 A | 12/1999 | Purnaveja et al. | 707/512 |
| 6,014,706 A | 1/2000 | Cannon et al. | 709/231 |
| 6,023,731 A | 2/2000 | Chawla | 709/231 |
| 6,032,130 A | 2/2000 | Alloul et al. | 705/27 |
| 6,035,341 A | 3/2000 | Nunally et al. | 709/253 |
| 6,041,345 A | 3/2000 | Levi et al. | 709/217 |
| 6,049,823 A | 4/2000 | Hwang | 709/218 |
| 6,064,794 A | 5/2000 | McLaren et al. | 386/68 |
| 6,118,450 A | 9/2000 | Proehl et al. | 345/349 |
| 6,118,817 A | 9/2000 | Wang | 375/240 |
| 6,128,653 A | 10/2000 | Del Val et al. | 709/219 |
| 6,133,920 A | 10/2000 | DeCarmo et al. | 345/354 |
| 6,144,375 A | 11/2000 | Jain et al. | 345/302 |
| 6,148,304 A | 11/2000 | De Vries et al. | 707/104 |
| 6,154,771 A | 11/2000 | Rangan et al. | 709/217 |
| 6,166,314 A | 12/2000 | Weinstock et al. | 84/483.1 |
| 6,173,317 B1 | 1/2001 | Chaddha et al. | 709/219 |
| 6,185,573 B1 * | 2/2001 | Angelucci et al. | 707/104.1 |
| 6,204,840 B1 | 3/2001 | Petelycky et al. | 345/302 |
| 6,215,910 B1 | 4/2001 | Chaddha | 382/253 |
| 6,230,172 B1 | 5/2001 | Purnaveja et al. | 707/512 |
| 6,233,389 B1 | 5/2001 | Barton et al. | 386/46 |
| 6,239,801 B1 * | 5/2001 | Chiu et al. | 715/500.1 |
| 6,243,708 B1 * | 6/2001 | deVries et al. | 707/102 |
| 6,377,995 B1 * | 4/2002 | Agraharam et al. | 709/231 |
| 6,414,686 B1 * | 7/2002 | Protheroe et al. | 345/474 |
| 6,487,564 B1 * | 11/2002 | Asai et al. | 715/500.1 |
| 6,490,580 B1 * | 12/2002 | Dey et al. | 707/4 |
| 6,636,238 B1 * | 10/2003 | Amir et al. | 345/730 |

FOREIGN PATENT DOCUMENTS

| | | |
|---|---|---|
| EP | 0653884 | 5/1995 |
| EP | 0669587 A2 | 8/1995 |
| EP | 0676898 | 10/1995 |
| EP | 0746158 | 12/1996 |
| EP | 0812112 A2 | 12/1997 |
| WO | WO 94/01964 | 1/1994 |
| WO | WO98/37698 | 8/1998 |

OTHER PUBLICATIONS

Haitao Jiang et al., "Spatial and temporal content-based access to hypervideo databases," The VLDB Journal (1998), No. 7, pp. 226-238.*

Stacie Hibino et al., "MMVIS: Design and Implementation of a Multimedia Visual Information Seeking Environment," Proceedings of the Fourth ACM International Conference on Multimedia (1996), pp. 75-86.*

Stacie Hibino et al., "A Visual Query Language for Identifying Temporal Trends in Video Data," IEEE 1995 Proceedings, International Workshop on Multi-Media Database Management Systems, pp. 74-81.*

H.J. Chen et al., "A Scalable Video-on-Demand Service for the Provision of VCR-Like Functions," IEEE, May 15, 1995, pp. 65-72.

Lynda Hardman et al., "Multimedia authoring paradigms," *Authoring and Application of Hypermedia-Based User-Interfaces, IEE Colloquium*, The Institution of Electrical Engineers 1995, pp. 8/1-8/3.

John David N. Dionisio and Alfonso F. Cardenas, "A Unified Data Model for Representing Multimedia, Timeline, and Simulation Data," *IEEE Transactions on Knowledge and Data Engineering*, vol. 10, No. 5, Sep./Oct. 1998, pp. 746-767.

Arons, Barry, "SpeechSkimmer: A System for Interactively Skimming Recorded Speech", ACM Transactions on Computer-Human, vol. 4, No. 1, pp. 3-38.

Internet Reference "An Annotated Bibliography of Interactive Speech User Interfaces by Barry Arons" HTTP://barons.www.media.mit.edu/people/barons/AronsAnnotated Bibliography.html, Date unknown.

"GSM Full Rate Speech Transcoding," ETSI/PT 12, Feb. 1992, pp. 1-93.

P. Vary et al., "Speech Codec for the European Mobile Radio System," 1998 IEEE, pp. 227-230.

Informedia—Internet Reference, http://www.informedia.cs.cmu.edu, date unknown.

Microsoft Corporation and RealNetworks, Inc., Advanced Streaming Format (ASF) Specification, Feb. 26, 1998, Public Specification Version 1.0, 55 pages.

* cited by examiner

SEARCHING AND RECORDING MEDIA STREAMS

TECHNICAL FIELD

This invention relates to networked client/server systems and to searching and recording streaming media content in such systems.

BACKGROUND OF THE INVENTION

Multimedia streaming—the continuous delivery of synchronized media data like video, audio, text, and animation—is a critical link in the digital multimedia revolution. Today, streaming media is primarily about video and audio, but a richer, broader digital media era is emerging with a profound and growing impact on the Internet and digital broadcasting.

Synchronized media means multiple media objects that share a common timeline. Video and audio are examples of synchronized media—each is a separate data stream with its own data structure, but the two data streams are played back in synchronization with each other. Virtually any media type can have a timeline. For example, an image object can change like an animated .gif file, text can change and move, and animation and digital effects happen over time. This concept of synchronizing multiple media types is gaining greater meaning and currency with the emergence of more sophisticated media composition frameworks implied by MPEG-4, Dynamic HTML, and other media playback environments.

The term "streaming" is used to indicate that the data representing the various media types is provided over a network to a client computer on a real-time, as-needed basis, rather than being pre-delivered in its entirety before playback. Thus, the client computer renders streaming data as it is received from a network server, rather than waiting for an entire "file" to be delivered.

Streaming multimedia content enables a variety of informational content that was not previously available over the Internet or other computer networks. Live content is one significant example of such content. Using streaming multimedia, audio, video, or audio/visual coverage of noteworthy events can be broadcast over the Internet as the events unfold. Similarly, television and radio stations can transmit their live content over the Internet.

However, one current problem with streaming multimedia content is that users are typically limited to accessing the multimedia content via common "shuttle controls" on a multimedia player, such as a play button, fast forward button, pause button, etc. Given that large amounts of data can be stored as multimedia content (e.g., individual presentations lasting for hours), such controls make it difficult for a user to locate the portions of the multimedia content that are of most interest to him or her.

An additional problem with streaming multimedia content is that the user must typically be connected to the same network as the server (e.g., the Internet) in order to receive the streaming multimedia content. If this connection is not maintained then the streaming of the multimedia content stops. This "continuous connection" limitation can be troublesome for many individuals, such as those using portable computers in locations that may not always have access to the appropriate network, or individuals who do not want to tie up a telephone line for their network connection while playing back the multimedia content.

The invention described below addresses these disadvantages, providing for the searching and recording of streaming media content.

SUMMARY OF THE INVENTION

In a networked client/server system, media content is streamed from the server to the client. A user of the client can search the media content to identify temporal locations that satisfy certain search criteria, and/or store the media content locally at the client for subsequent playback.

According to one aspect of the invention, indexes are maintained for each of different media streams that can be streamed to the client either individually or together for a multimedia presentation. The indexes store a correspondence between content for a media stream and temporal locations of that media stream. In response to a user search request, search criteria is compared to the appropriate index(es) to identify whether the search criteria matches any data in the index(es).

According to another aspect of the invention, in response to a user search request the search criteria from the search request is compared directly to the media stream data rather than to an index. This comparison is made to identify whether the search criteria matches any of the media stream data.

According to another aspect of the invention, if data matching the search criteria is found (either in an index or the media stream data), then the media server "seeks" to a temporal location of the media stream identified by the matching data. The server then proceeds to stream the media content to the client beginning at that temporal location.

According to another aspect of the invention, a search request and corresponding search criteria are compared to multiple media streams (either directly or indirectly via associated indexes). Thus, a single search request can be used to search through all of the media streams of a multimedia presentation.

According to another aspect of the invention, the multiple media streams of a multimedia presentation are streamed from the server to the client and stored locally by the client. A markup document, referencing the multiple media streams also stored locally at the client, is generated and stored at the client. Thus, a user can play back the locally stored multimedia presentation at a later time when not coupled to a network and thus not able to receive streaming media from the server.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

General Network Structure

Figure 1:
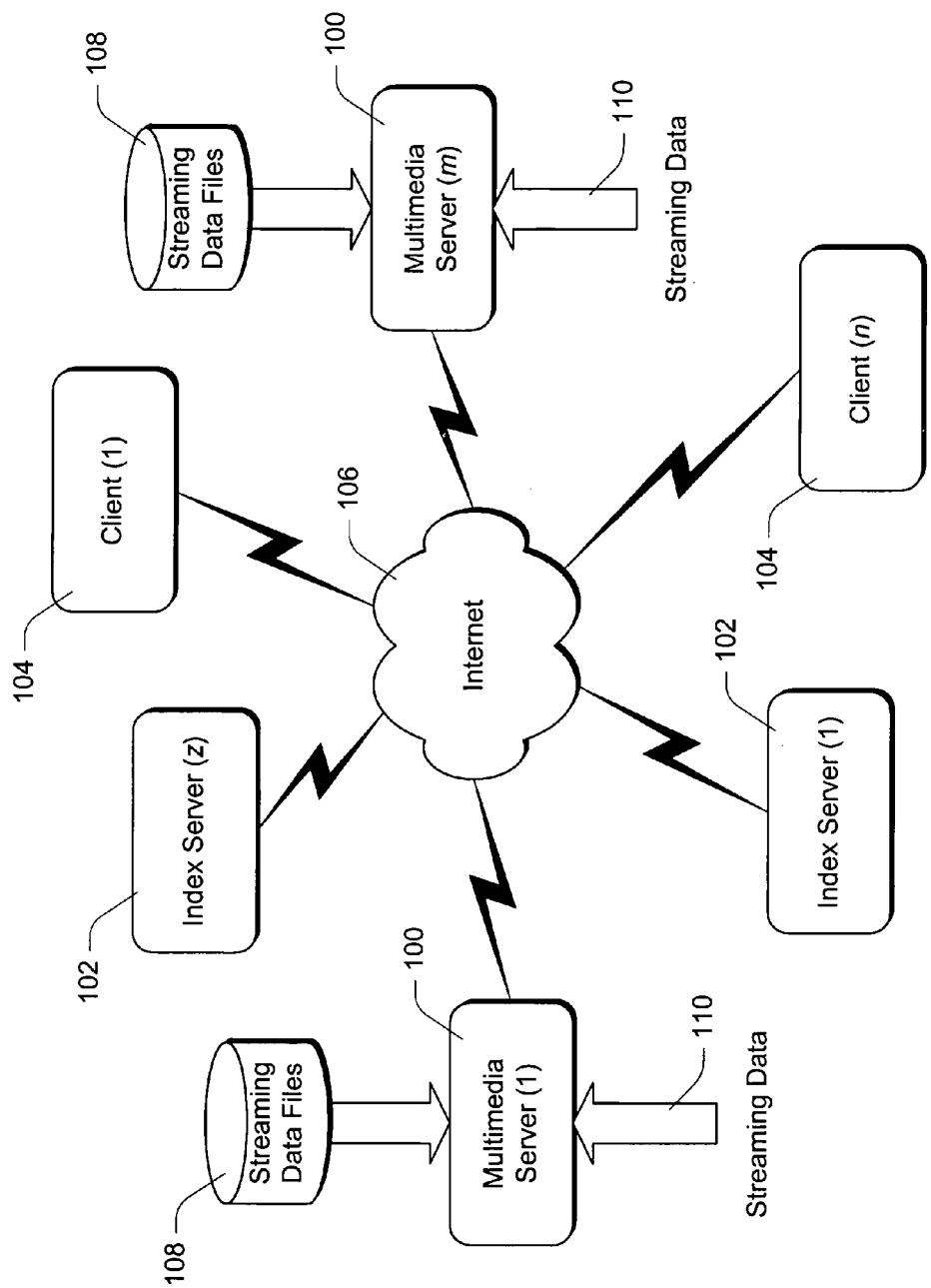
FIG. 1 shows a client/server network system and environment in accordance with the invention.

FIG. 1 shows a client/server network system and environment in accordance with the invention. Generally, the system includes one or more (m) network multimedia server computers 100, one or more (z) index server computers 102, and one or more (n) network client computers 104. The computers communicate with each other over a data communications network, which in FIG. 1 includes a public network 106 such as the Internet. The data communications network might also include local-area networks and/or private wide-area networks. Server computers 100 and client computers 104 communicate with one another via any of a wide variety of known protocols, such as the Hypertext Transfer Protocol (HTTP).

Multimedia servers 100 have access to streaming media content in the form of different media streams. These media streams can be individual media streams (e.g., audio, video, graphical, text, etc.), or alternatively composite media streams including multiple such individual streams. Some media streams might be stored as files 108 in a database or other file storage system, while other media streams 110 might be supplied to the server on a "live" basis from other data source components through dedicated communications channels or through the Internet itself.

The media streams received from servers 100 are rendered at the client computers 104 as a multimedia presentation, which can include media streams from one or more of the servers 100. These different media streams can include one or more of the same or different types of media streams. For example, a multimedia presentation may include two video streams, one audio stream, and one stream of graphical images.

A user interface (UI) at the client computer 104 allows users to control the playback of the multimedia presentation, such as selecting which of multiple presentations to play back, controlling pausing of the playback, etc. The UI at client 104 further allows a user to input search criteria for searching one or more of the individual media streams available from a server 100, and to save the media streams of a multimedia presentation for subsequent playback when not coupled to network 106.

Index servers 102 optionally maintain indexes for the streaming media data available from servers 100. These indexes provide a correspondence between elements or objects of the media data streams and temporal locations of the media data streams. These indexes can be used for searching the media data streams, as discussed in more detail below. Alternatively, the indexes may be maintained at the media servers 100.

Streaming Media

In this discussion, streaming media refers to one or more individual media streams being transferred over a network to a client computer on an as-needed basis rather than being pre-delivered in their entirety before playback. Each of the individual media streams corresponds to and represents a different media type and each of the media streams can be rendered by a network client to produce a user-perceivable presentation using a particular presentation medium. The individual media streams can be rendered to produce a plurality of different types of user-perceivable media, including synchronized audio or sound, video graphics or motion pictures, animation, textual content, command script sequences, or other media types that convey time-varying information or content in a way that can be sensed and perceived by a human. The individual media streams have their own timelines, which are synchronized with each other so that the media streams can be rendered simultaneously for a coordinated multimedia presentation. These individual media streams can be delivered to the client computer as individual streams from one or more servers, as a composite media stream(s) from one or more servers, or a combination thereof.

In this discussion, the term "composite media stream" describes synchronized streaming data that represents a segment of multimedia content. The composite media stream has a timeline that establishes the speed at which the content is rendered. The composite media stream can be rendered to produce a plurality of different types of user-perceivable media, such as synchronized audio or sound, video graphics or motion pictures, animation, textual content, command script sequences, etc. A composite media stream includes a plurality of individual media streams representing the multimedia content.

There are various standards for streaming media content and composite media streams. "Advanced Streaming Format" (ASF) is an example of such a standard, including both accepted versions of the standard and proposed standards for future adoption. ASF specifies the way in which multimedia content is stored, streamed, and presented by the tools, servers, and clients of various multimedia vendors. ASF provides benefits such as local and network playback, extensible media types, component download, scalable media types, prioritization of streams, multiple language support, environment independence, rich inter-stream relationships, and expandability. Further details about ASF are available from Microsoft Corporation of Redmond, Wash.

Regardless of the streaming format used, an individual data stream contains a sequence of digital data units that are rendered individually, in sequence, to produce an image, sound, or some other stimuli that is perceived by a human to be continuously varying. For example, an audio data stream comprises a sequence of sample values that are converted to a pitch and volume to produce continuously varying sound. A video data stream comprises a sequence of digitally-specified graphics frames that are rendered in sequence to produce a moving picture. An animation stream comprises a sequence of graphical images that are rendered in sequence to produce a moving image. An image stream comprises a sequence of graphical images that are rendered to produce a changing image over time. A text stream is a sequence of symbols and/or alphanumeric characters that are rendered to produce different symbol/character combinations over time (e.g., in the form of words).

For a composite media stream, the individual data streams are typically interleaved in a single sequence of data packets. Various types of data compression might be used within a particular data format to reduce communications bandwidth requirements.

The sequential data units (such as audio sample values, video frames, groups of characters, graphical images, etc.) of the individual streams are associated with both delivery times and presentation times, relative to an arbitrary start time. The delivery time of a data unit indicates when the data unit should be delivered to a rendering client. The presentation time indicates when the value should be actually rendered. Normally, the delivery time of a data unit precedes the presentation time.

The presentation times determine the actual speed of playback. For data streams representing actual events or performances, the presentation times correspond to the relative times at which the data samples were actually recorded. The presentation times of the various different individual data streams are consistent with each other so that the streams remain coordinated and synchronized during playback.

Exemplary Computer Environment

In the discussion below, the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

Alternatively, the invention could be implemented in hardware or a combination of hardware, software, and/or firmware. For example, one or more application specific integrated circuits (ASICs) could be programmed to carry out the invention.

Figure 2:
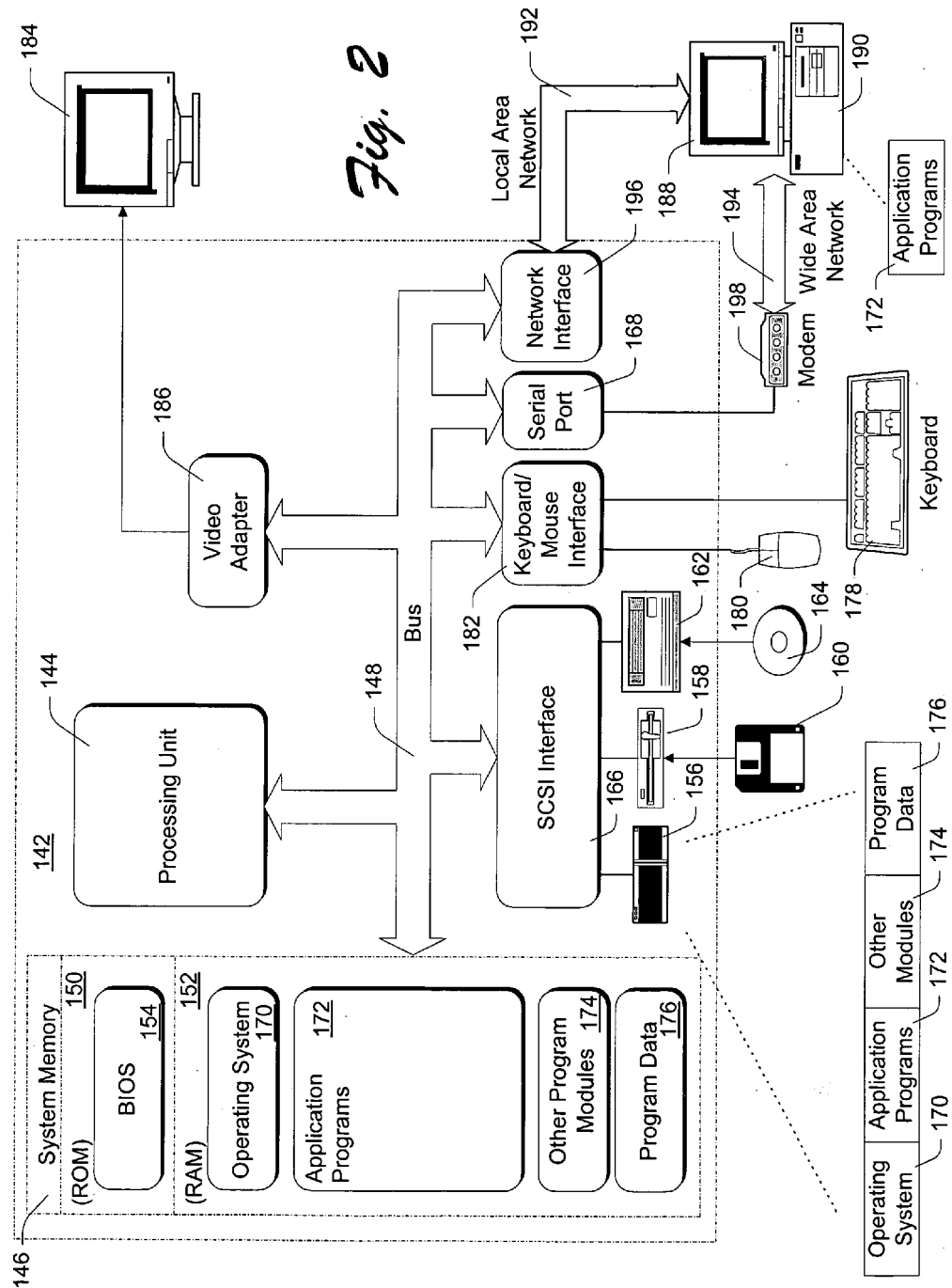
FIG. 2 shows a general example of a computer that can be used in accordance with the invention.

FIG. 2 shows a general example of a computer 142 that can be used in accordance with the invention. Computer 142 is shown as an example of a computer that can perform the functions of any of server computers 100 or 102, or client computers 104 of FIG. 1.

Computer 142 includes one or more processors or processing units 144, a system memory 146, and a bus 148 that couples various system components including the system memory 146 to processors 144.

The bus 148 represents one or more of any of several types of bus structures, including a memory bus or memory controller, a peripheral bus, an accelerated graphics port, and a processor or local bus using any of a variety of bus architectures. The system memory includes read only memory (ROM) 150 and random access memory (RAM) 152. A basic input/output system (BIOS) 154, containing the basic routines that help to transfer information between elements within computer 142, such as during start-up, is stored in ROM 150. Computer 142 further includes a hard disk drive 156 for reading from and writing to a hard disk, not shown, a magnetic disk drive 158 for reading from and writing to a removable magnetic disk 160, and an optical disk drive 162 for reading from or writing to a removable optical disk 164 such as a CD ROM or other optical media. The hard disk drive 156, magnetic disk drive 158, and optical disk drive 162 are connected to the system bus 148 by an SCSI interface 166 or some other appropriate interface. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. A user may enter commands and information into computer 142 through input devices such as keyboard 178 and pointing device 180. Other input devices (not shown) may include a microphone, joystick, game pad, satellite dish, scanner, or the like. These and other input devices are connected to the processing unit 144 through an interface 182 that is coupled to the system bus. A monitor 184 or other type of display device is also connected to the system bus 148 via an interface, such as a video adapter 186. In addition to the monitor, personal computers typically include other peripheral output devices (not shown) such as speakers and printers.

Computer 142 operates in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 2. The logical connections depicted in FIG. 2 include a local area network (LAN) 192 and a wide area network (WAN) 194. Such networking environments are commonplace in offices, enterprise-wide computer networks, intranets, and the Internet. In the described embodiment of the invention, remote computer 188 executes an Internet Web browser program such as the "Internet Explorer" Web browser manufactured and distributed by Microsoft Corporation of Redmond, Wash.

When used in a LAN networking environment, computer 142 is connected to the local network 192 through a network interface or adapter 196. When used in a WAN networking environment, computer 142 typically includes a modem 198 or other means for establishing communications over the wide area network 194, such as the Internet. The modem 198, which may be internal or external, is connected to the system bus 148 via a serial port interface 168. In a networked environment, program modules depicted relative to the personal computer 142, or portions thereof, may be stored in the remote memory storage device. It will be appreciated that the network connections shown are exemplary and other means of establishing a communications link between the computers may be used.

Generally, the data processors of computer 142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Searching Data Streams

As shown in FIG. 1, a network system in accordance with the invention includes network server(s) 100 from which a plurality of composite media streams are available. In some cases, the composite media streams are actually stored by server(s) 100. In other cases, server(s) 100 obtains the composite media streams from other network sources or devices.

The system also includes network clients 104. Generally, the network clients are responsive to user input to select or request identified multimedia presentations. In response to a request for a multimedia presentation, server(s) 100 streams the requested media stream(s) to the network client in accordance with some known format such as ASF. The client renders the data streams to produce the multimedia presentation.

Figure 3:
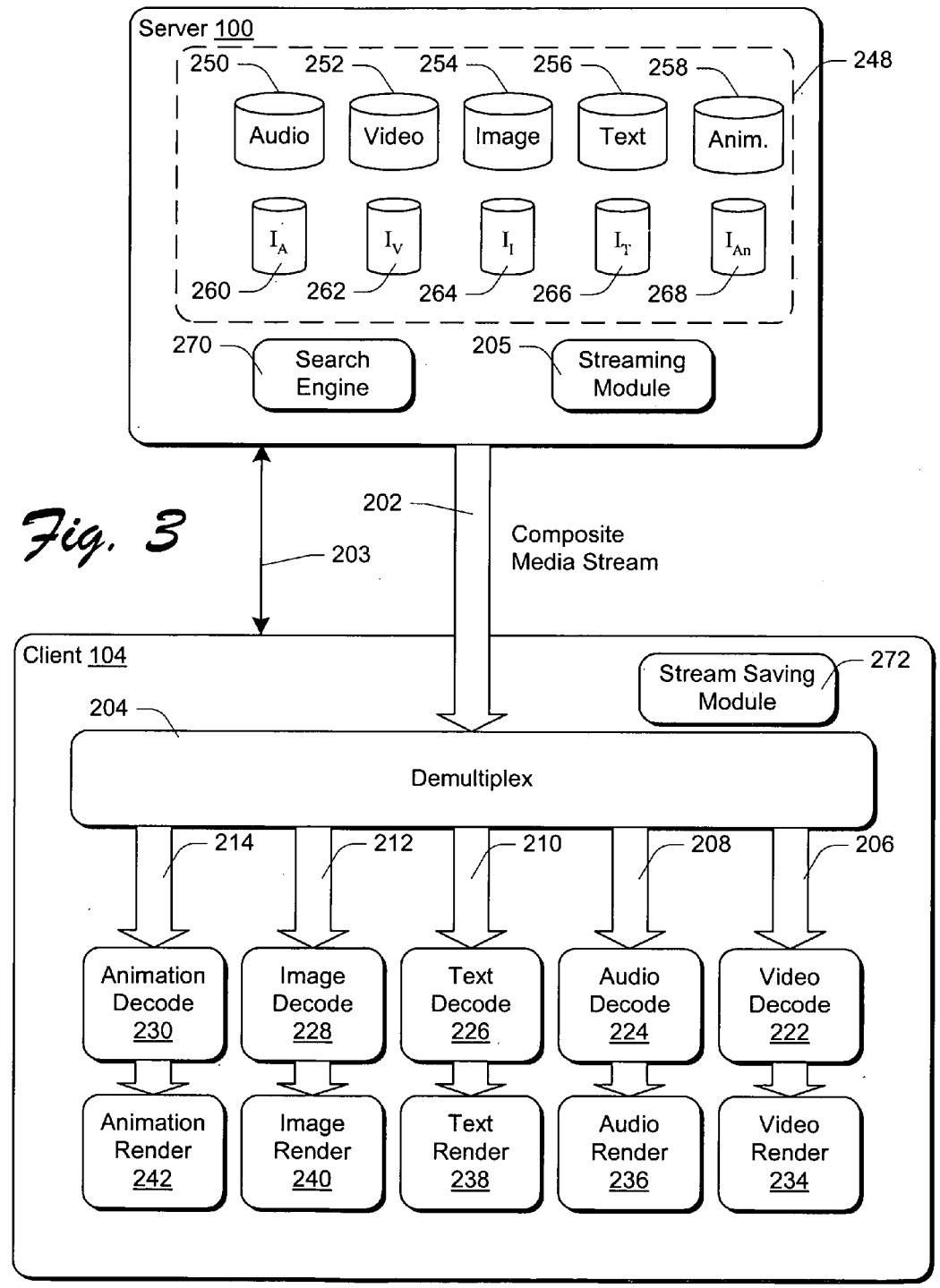
FIG. 3 illustrates an exemplary client-server relationship for streaming data.

FIG. 3 illustrates an exemplary client-server relationship for streaming data. A network server 100 is illustrated streaming a composite media stream 202 to a client 104. Alternatively, multiple servers 100 could be streaming individual or composite media streams to client 104. Additional control information 203 is also communicated between server 100 and client 104 to manage the streaming of composite media stream 202 to client 104.

When a user requests a particular composite media stream, client 104 requests the underlying media streams from the appropriate server(s) 100. This request can be from a standalone control application that is stored and executed at client 104, or alternatively an application that is hosted at a server 100 and is transmitted to client 104 for execution. For example, the control application could be hosted in a HTTP web page (maintained by either server 100 or another server coupled to the network) in accordance with Hypertext Markup Language (HTML) or Extended Markup Language (XML). The control application (whether standalone or server-hosted) includes identifier(s) of the composite media stream and/or the individual media streams of the multimedia presentation, and coordinates when and how they are presented at client 104.

Each media stream has a timeline, and the timelines of the individual streams are synchronized with each other so that the streams can be rendered in combination to produce coordinated multimedia content at the network client 104. A streaming module 205 in server 100 manages the streaming of the composite media stream to client 104 based at least in part on the delivery times of the data units in the composite media stream.

The client computer has a demultiplexer component 204 that receives the composite media stream and separates out the individual media streams from the composite format in which the data is streamed (such as ASF). This results in a video stream 206, an audio stream 208, a text stream 210, an image stream 212, and an animation stream 214.

The individual media streams are received from demultiplexer 204 by respective decoders 222, 224, 226, 228, and 230 that perform in accordance with the particular data format being employed. For example, the decoders might perform data decompression. The decoded streams are then provided to and received by respective renderers 234, 236, 238, 240, and 242. The rendering components 234–242 render the streams as the streams continue to be streamed from the network server 100.

Server 100 stores a composite media stream 248 (e.g., in accordance with ASF) including multiple individual media streams 250–258 for a multimedia presentation. The individual media streams are of different types, which in the illustrated embodiment are audio stream 250, video stream 252, image stream 254, text stream 256, and animation stream 258. A streaming module 205 manages, on behalf of server 100, the communication between server 100 and client 104, including the streaming of the composite media stream 202 and communication of control information to and from client 104.

Server 100 also stores indexes 260–268, each corresponding to one of the individual media streams 250–258. Indexes 260–268 can be part of the same composite media stream 248 as the individual media streams 250–258, or alternatively may be stored separately. In the illustrated example, each individual media stream 250–258 has a corresponding index 260–268, illustrated as audio index 260, video index 262, image index 264, text index 266, and animation index 268. Alternatively, one or more of the indexes 260–268 may be combined together.

Alternatively, some or all of indexes 260–268 may be stored at a remote server, such as index server 102 of FIG. 1. Or, in other alternate embodiments, some or all of indexes 260–268 may be stored at client 104 or transferred to client 104 for searching.

Each of the indexes 260–268 maintains a correspondence between a particular term or element of the associated media stream and a temporal location of the associated media stream. This correspondence identifies, for each term or element, a temporal location(s) of the associated media stream at which that term or element occurs. This correspondence can be maintained by storing multiple entries in the index, each entry including a term or element of the associated media stream and a temporal location(s) at which that term or element occurs. In one implementation these terms or elements are characters, words, symbols, or groups thereof. Alternatively the exact nature of these terms or elements may be dependent on the nature of the associated media stream. For example, text index 266 may include words or phrases as terms or elements, while audio index 260 may include digital representations of audio waveforms as terms or elements.

Indexes 260–268 can be generated in any of a wide variety of manners, including both manual and automatic generation. Manual generation can be performed by an individual (e.g., the author of the multimedia presentation) manually identifying the different terms or elements to index for each of the individual media streams and the temporal location(s) of each of these terms or elements. Automatic generation of the indexes can be performed by server 100 or another device. The manner in which the automatic generation is carried out is dependent on the nature of the associated individual media stream.

Text streams can be indexed based on different elements, such as characters, symbols, words, or groups thereof (e.g., phrases or sentences). In the illustrated example, server 100 (or other device generating the index) generates the index by identifying each of the elements in the text stream and their corresponding presentation times. As each element can occur multiple times in a text stream, multiple presentation times may be identified for the index.

Image streams can be indexed in a similar manner as text streams. Any of a variety of conventional pattern recognition techniques can be used to identify particular objects in the image stream or different characteristics of those objects (e.g., color). A textual description of each of these objects is included as an element in the index, along with its corresponding presentation time.

Animation streams can be indexed in an analogous manner as image streams. However, each object in the animation may have a range of presentation times corresponding to, for example, the object moving or changing locations over time. Thus, multiple presentation times (the presentation times for this range) may be associated with the object. The earliest presentation time in the range may be used in the index as the temporal location for this object, or alternatively another temporal location within the range may be used (e.g., the entire range, or alternatively a mid-range or "average" temporal range).

Audio streams can be similarly indexed. Conventional audio analysis techniques may be used to identify words or groups of words in the audio stream, based on the digital representation of the analog waveform of the audio content. These digital representations of words or groups of words are stored in the index along with their temporal locations in the audio content. Alternatively, conventional speech to text techniques can be used to convert the audio stream to words which can then be included in the index analogous to text streams discussed above.

Video streams can also be indexed. Using image analysis techniques similar to those for analyzing image streams, different objects within the video stream can be identified and included in the index. Alternatively, general video frame characteristics can be indexed, such as predominant colors within the frame. Objects in a video stream may correspond to a range of presentation times analogous to those in animation streams, and the temporal locations of these can be stored in the index in a manner analogous to those of animation streams.

A user at client 104 can search through the media streams 250–258 by submitting a search request and search criteria (e.g., particular words, or other text or symbols) to server 102. A search engine 270 receives such search requests and accompanying search criteria at server 102. Search engine 270, upon receipt of the search request, compares the search criteria to the entries in each of indexes 260–268 to determine whether any of the entries match or are satisfied by the search criteria. Thus, a single search request from the user can initiate searching of multiple individual media streams. Alternatively, the user may identify in the search request specific media streams that are to be searched, with the other media streams to be left unsearched.

Additionally, search engine 270 can search multiple different individual or composite streams located at server 100, regardless of whether the streams correspond to the same or different media presentations. Alternatively, search engine 270 may forward a search request to other servers 100 to identify matches with media streams stored at such servers. Thus, a single search request from the user can initiate searching of media streams of multiple different media presentations regardless of where the streams are stored.

Alternatively, search engine 270 may not use indexes 260–268. Rather, upon receipt of a search request search engine 270 can access the various steams 250–258 directly to identify terms or elements to compare to the search criteria. These terms or elements can be identified in any of the manners discussed above with reference to generating the indexes.

Situations can arise where the search criteria match multiple entries in the index. For example, a particular object may occur multiple times in an image stream and thus have multiple temporal locations associated with it in the index. Search engine 270 can identify one of these temporal locations to use as the result of the search process. In one implementation, if the media stream is currently being played back, then the current presentation time of the multimedia presentation is identified (e.g., from client 104). Search engine 270 then selects the next temporal location associated with the index entry that is after the current presentation time. Alternatively, search engine 270 may select the temporal location that is closest to the current presentation time as the result, or alternatively may use some other process for identifying one of the presentation times. Alternatively, search engine 270 may make such determinations based on the delivery times for the data units of the media stream rather than the presentation times.

Search engine 270 can take a variety of different actions when a term or element in the index matches the search criteria. For example, the search engine 270 may inform streaming module 205 to "seek" to that temporal location and begin streaming the media stream to client 104 at that temporal location. By way of another example, the matching entry and associated temporal locations) may be returned to client 104 and displayed to the user.

Additionally, the search process may make use of global variables. For example, a global character can be used to represent one or more characters, symbols, or words during the searching process.

Figure 4:
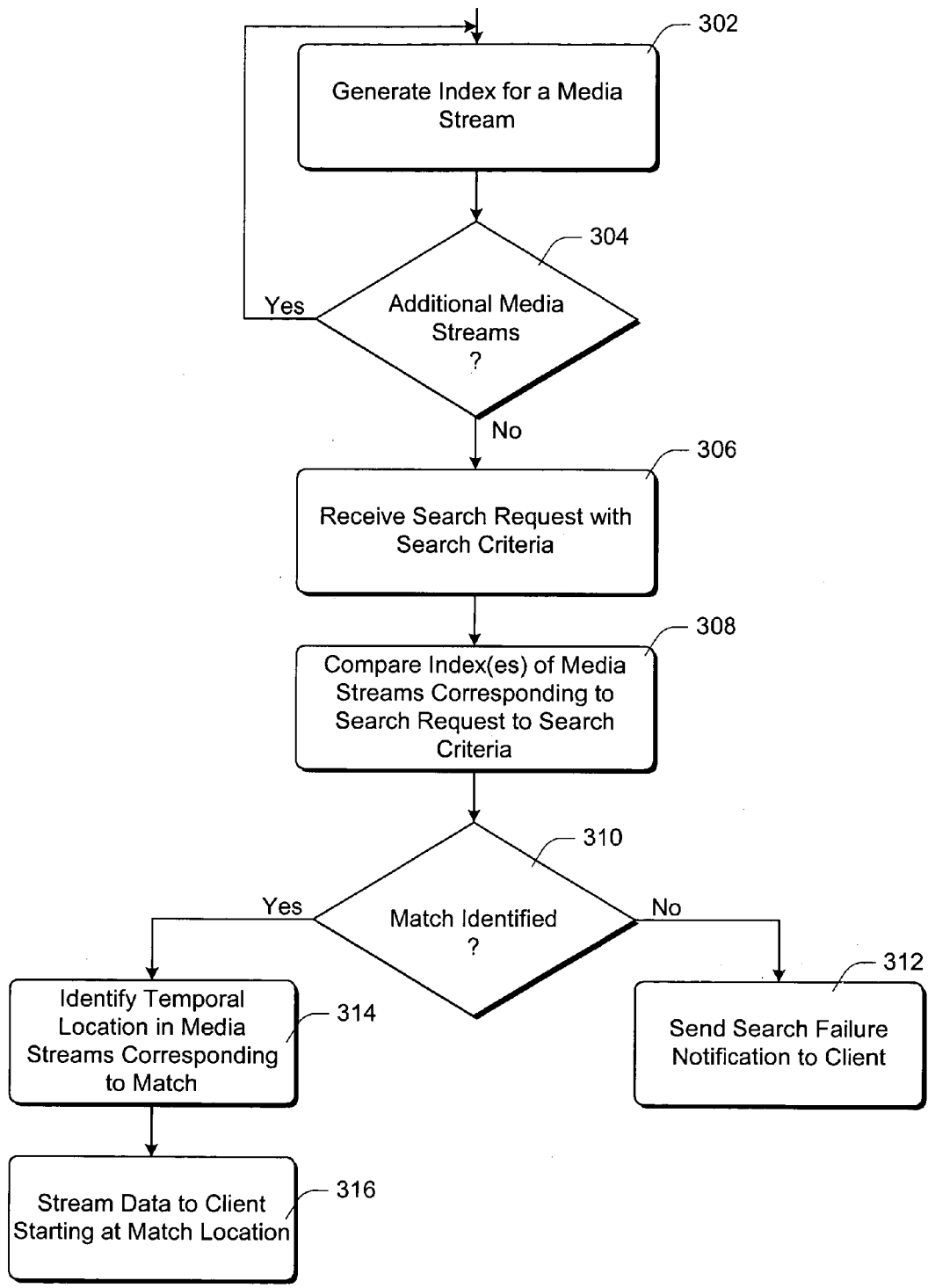
FIG. 4 is a flowchart illustrating an exemplary process for searching media streams in accordance with one implementation of the invention.

FIG. 4 is a flowchart illustrating an exemplary process for searching media streams in accordance with one implementation of the invention. The process of FIG. 4 may be performed in software, firmware, hardware, or any combination thereof. FIG. 4 is described with additional reference to components in FIGS. 1 and 3.

An index for one of the media streams of a media presentation is initially generated, step 302. Indexes for any additional media streams are also generated, steps 304 and 302. This index generation can be carried out by multimedia server 100, index server 102, or alternatively some other device (not shown) and subsequently transferred to server 100 or 102.

Once the indexes are generated, server 100 eventually receives a search request with accompanying search criteria, step 306. Search engine 270 compares the index(es) of the media stream(s) corresponding to the search request to the search criteria, step 308, and attempts to identify a match, step 310. If no match is identified, then an indication that the search failed is sent to the client, step 312. Alternatively, steps 308–310 may be carried out at an index server 102 or client 104 rather than media server 102.

However, if a match is identified then search engine 270 identifies a temporal location corresponding to the match (selecting one of multiple temporal locations if necessary), step 314. Streaming module 205 then streams, to client 104, the data for the media presentation starting at a location based on the identified temporal location, step 316. Streaming module 205 may stream the data beginning at the identified temporal location, or alternatively may "rewind" or "back up" to a temporal point prior to the temporal location. This "rewinding" may be of a fixed amount (e.g., three seconds), or alternatively may be based on pauses or breaks. For example, conventional audio or video analysis programs may be used to identify pauses or breaks in the speech or action in the multimedia presentation, and module 205 may search back through the multimedia presentation beginning at the identified temporal location to identify such a pause or break and begin streaming at that location. Alternatively, rather than "seeking" to the match location in step 316, other indications of a match may be provided to client 104.

In alternative implementations, the index generation of steps 302–304 is performed in response to a user search request rather than as an initialization process as illustrated in FIG. 4. For example, when a user submits a request for a multimedia presentation that has not been indexed, the index generation may occur in response to the request (either generating all of the indexes or only those necessary until a match with the search criteria is reached).

Alternatively, rather than performing any sort of "rewind" or "backing up" process during the search request, such rewinding can be performed at the time the index is generated. Thus, rather than storing a specific presentation time that corresponds to the time that a particular term or object occurs in the multimedia presentation, the index could store the presentation times that should be used to begin playback of the multimedia presentation in the event of a match to the particular term or object.

Figure 5:
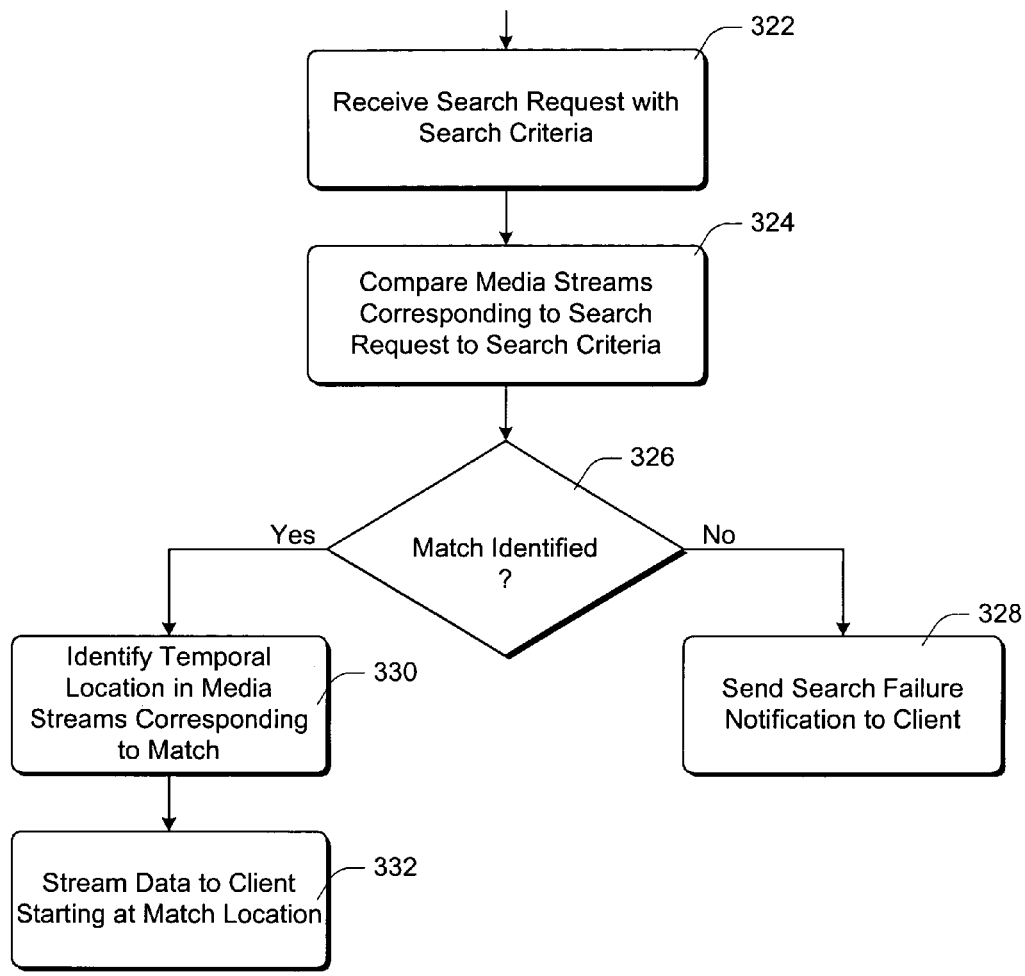
FIG. 5 is a flowchart illustrating another exemplary process for searching media streams in accordance with another implementation of the invention.

FIG. 5 is a flowchart illustrating another exemplary process for searching media streams in accordance with another implementation of the invention which does not use indexes. The process of FIG. 5 may be performed in software, firmware, hardware, or any combination thereof. FIG. 5 is described with additional reference to components in FIGS. 1, 3 and 4.

A search request and corresponding search criteria are initially received by server 100, step 322. Search engine 270 then compares the data of the media streams corresponding to the search request to the search criteria, step 324. If no match is identified, step 328, then an indication that the search has failed is sent to client 104, step 328. However, if a match is identified, then search engine 270 identifies the temporal location in the media streams corresponding to the match, step 330. Streaming module 205 then begins streaming the media presentation to the client starting at the match location, step 332, analogous to step 316 of FIG. 4.

The comparisons performed by search engine 270 in steps 308 of FIG. 4 and 324 of FIG. 5 can be carried out in a variety of different manners. In one implementation, the comparisons are made through each of the indexes (or media streams) to identify all possible matches to the search criteria and then the temporal location of one of these matches is selected in step 314 (FIG. 4) or 330 (FIG. 5). Alternatively, all of these possible matches may be provided to the user (e.g., the presentation times) and the user can select one of them to "seek" to. Alternatively, as soon as one match of the search criteria is found the comparison can stop and that temporal location seeked to. Alternatively, search engine 270 may identify the current presentation time of the multimedia presentation and search, from that temporal location on, for the next presentation time in each of the media streams that satisfies the search request and select from this set of presentation times.

Recording Data Streams

Returning to FIG. 3, client 104 also includes a stream saving module 272. Module 272 stores composite media stream 202 locally at client 104 as stream 202 is received. Module 272 also optionally receives indexes 260–268 and stores them locally at client 104 as well. This storage can be done concurrently with the rendering of the media streams, or alternatively can be carried out independently without rendering the streams. Module 272 can store the media streams locally in response to a user request to store the streams, or alternatively automatically in response to some other event or action (e.g., an indication of search criteria being satisfied from server 100).

Module 272 also generates and stores a markup document that describes how the various media streams are to be rendered (e.g., the screen locations for audio, text, image, and animation streams). This markup document can be generated using any of a variety of conventional programming languages, such as HTML or XML. In the illustrated example, module 272 generates the markup document by modifying a pre-existing markup document, such as one received from server 100 for the rendering of the individual media streams 250–258. Module 272 modifies the pre-existing markup document by searching the pre-existing document for references to the locations of media streams 250–258 and changing those references to the locally stored media streams. Alternatively, module 272 may generate such a markup document "from scratch".

Module 272 may also "package" the locally stored media streams and the modified markup document into the same file or folder, thereby allowing easier transport of the files. It is to be appreciated that the locally stored media streams could be transferred or copied to another client and played back without requiring further modification to the markup document so long as the path names where the files are stored on the different clients remain the same.

Figure 6:
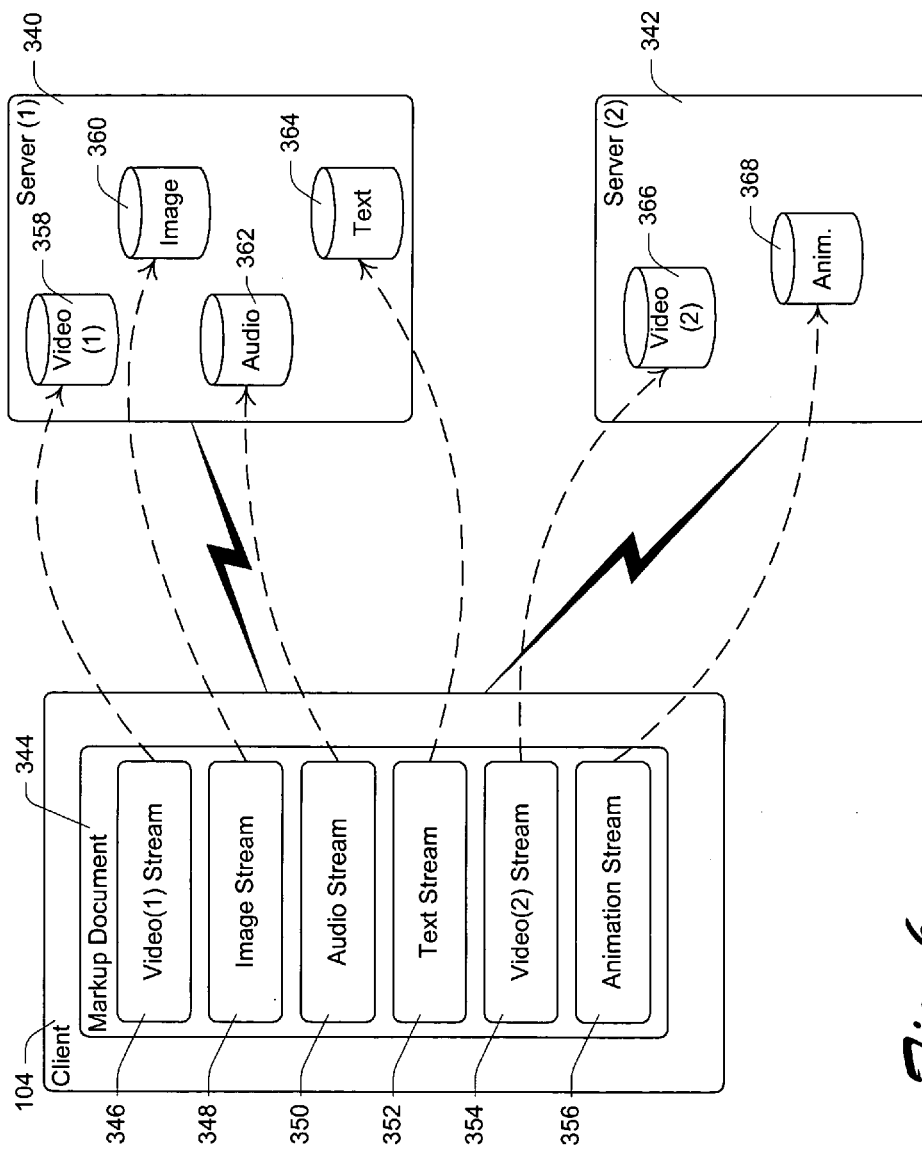
FIGS. 6 and 7 are block diagrams illustrating the local storage of a multimedia presentation in accordance with one implementation of the invention.
Figure 7:
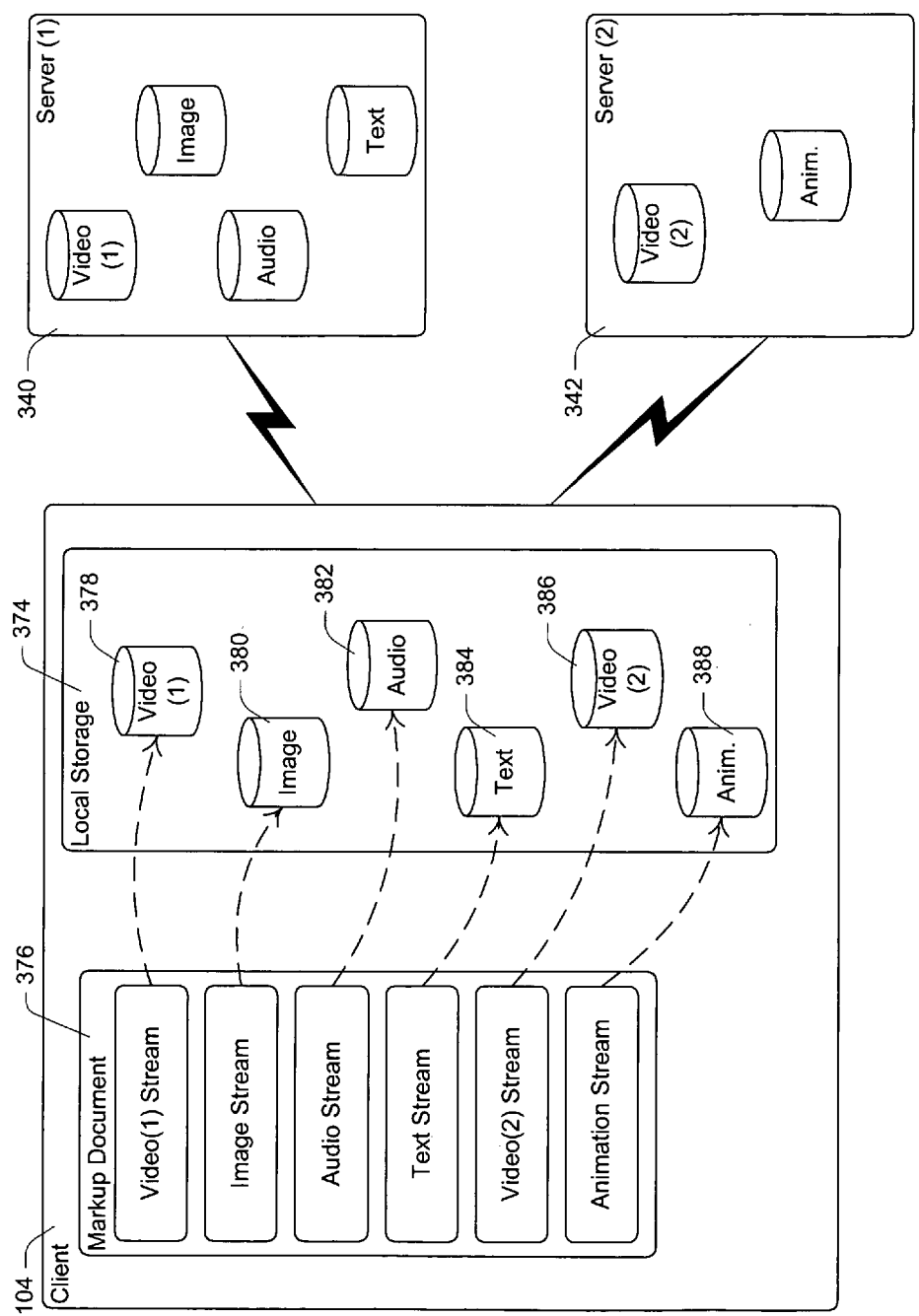

FIGS. 6 and 7 are block diagrams illustrating the local storage of a multimedia presentation in accordance with one implementation of the invention. In FIGS. 6 and 7, a multimedia presentation is shown including two video streams, an image stream, an audio stream, a text stream, and an animation stream. Initially, these streams are stored at two different remote multimedia servers 340 and 342. A markup document 344 of FIG. 6 at client 104 includes references to or identifiers of the various individual media streams, illustrated as identifiers 346–356. As shown, each of the identifiers 346–356 identifies one of the remotely stored media streams 358–368, respectively.

To store the multimedia presentation locally, the media streams 358–368 are streamed (or otherwise copied) to local storage 374 of FIG. 7. Markup document 344 is also modified to generate markup document 376 that references the locally stored media streams 378–388. By changing the references to the locally stored media streams 378–388, subsequent playback of the multimedia presentation using markup document 376 will result in the locally stored streams 378–388 being played back (being input to either demultiplexer 204 or the decoders 222–230 directly) rather than the remotely stored streams 358–368 of FIG. 6, thereby avoiding any access to remote servers.

Figure 8:
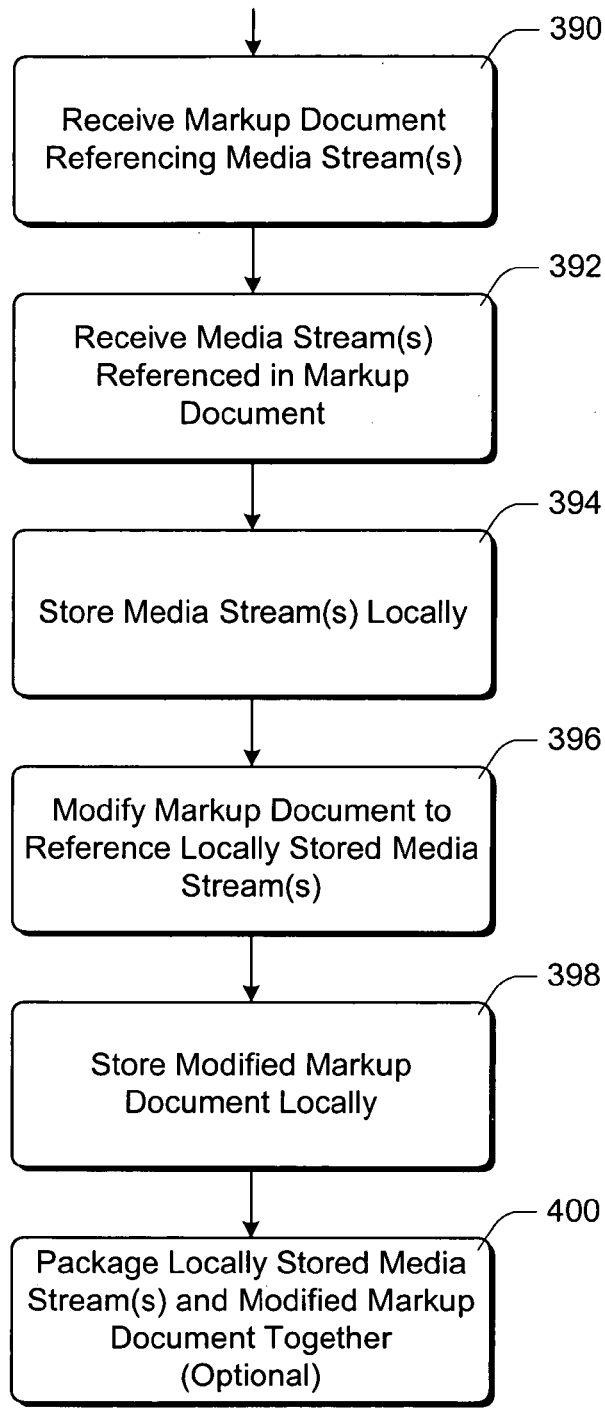
FIG. 8 is a flowchart illustrating an exemplary process for recording a multimedia presentation in accordance with one implementation of the invention.

FIG. 8 is a flowchart illustrating an exemplary process for recording a multimedia presentation in accordance with one implementation of the invention. The process of FIG. 8 is performed by client 104 of FIG. 3 and may be performed in software, firmware, hardware, or any combination thereof. FIG. 8 is described with additional reference to components in FIG. 3.

Client 104 initially receives a markup document referencing one or more media streams of a media presentation, step 390. Client 104 also receives the media stream(s) of the media presentation, step 392. The received media stream(s) are stored locally at client 104, step 394. Client 104 also modifies the markup document received in step 390 to reference the locally stored media stream(s), step 396, and stores the modified markup document locally, step 398. Client 104 may also optionally package the locally stored media stream(s) and modified markup document into a single file or folder, allowing for easy subsequent transfer of the files.

CONCLUSION

The invention allows for searching and recording of streaming multimedia data. Any or all of the multiple data streams of a multimedia presentation can advantageously be searched via a single search request by a user, and the user can be immediately presented with the temporal location of the multimedia presentation that satisfies his or her search request. Additionally, a streaming multimedia presentation can advantageously be saved locally, allowing subsequent playback of the presentation when not connected to the remote multimedia servers.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method of searching streaming media presentations, the method comprising:
   receiving a search request including search criteria;
   determining a temporal location in a streaming media presentation that corresponds to data of the media presentation that matches the search criteria; and
   streaming at least a portion of the media presentation in response to determining the temporal location to a source of the request.

2. A method as recited in claim 1, further comprising saving at least a portion of a media data stream of the streaming portion the media presentation locally at a client computer if data in the media presentation matches the search criteria.

3. A method as recited in claim 1, wherein the determining comprises checking, for each of a plurality of individual media steams of the media presentation, whether data of the media stream matches the search criteria.

4. A method as recited in claim 1, wherein the determining comprises comparing data of media streams corresponding to a plurality of different media presentations to the search criteria.

5. A method as recited in claim 1, wherein the temporal location is based on a time at which the media presentation is to be rendered.

6. A method as recited in claim 1, wherein the media presentation comprises a composite media stream including a plurality of individual media streams.

7. A method as recited in claim 1, wherein the streaming comprises streaming at least the portion of the media presentation to a user.

8. A method as recited in claim 1, wherein the receiving comprises receiving the request from a client computer via a network.

9. A method as recited in claim 1, wherein the receiving comprises receiving the request, at an index sever, from a media server via a network.

10. A method as recited claim 1, wherein the determining comprises:

accessing an index corresponding to an individual media data steam of the media presentation;
   checking whether the search criteria matches data in the index; and
   if the search criteria matches data in the index then identifying a presentation time of the media presentation at which the search criteria are satisfied.

11. A method as recited in claim 1, wherein the search criteria comprises user-specified criteria.

12. A method as recited in claim 1, wherein the returning streaming comprises sending an indication of the temporal location from an index server to a media server that is a source of at least part of the media presentation.

13. One or more computer-readable memories containing a computer program that is executable by a processor to perform the method recited in claim 1.

14. A method of searching streaming media presentations, the method comprising:
   receiving a search request including search criteria;
   determining a temporal location in a streaming media presentation that corresponds to data of the media presentation that matches the search criteria, wherein the data of the media presentation includes a particular term or element of the streaming media presentation; and
   in response to determining the temporal location:
      returning an indication of the temporal location to a source of the requests,
      seeking to the temporal location, and
      streaming at least a portion of the media presentation to a client based on the temporal location.

15. A method as recited in claim 14, wherein the streaming comprises streaming the media presentation to the client beginning at the temporal location.

16. A method according to claim 14, wherein the particular term or element of the streaming media presentation includes any one of characters, words, symbols, or groups thereof.

17. A method according to claim 14, wherein the particular term or element of the streaming media presentation includes digital representations of audio waveforms.

18. An apparatus comprising:
   a memory device to store a plurality of multimedia data streams corresponding to a streaming multimedia presentation; and
   a search engine, coupled to the memory device, to:
      receive a search request corresponding to the multimedia presentation,
      determine whether any of the multimedia data streams corresponding to the multimedia presentation satisfy search criteria corresponding to the search request, and
      return an indication of whether any of the multimedia data streams satisfy the search criteria; and
   a streaming component to stream at least a portion of the multimedia presentation in response to determining that a multimedia data stream satisfies search criteria corresponding to the search request.

19. An apparatus as recited in claim 16, wherein the memory device comprises a random access memory.

20. An apparatus as recited in claim 18, wherein the apparatus comprises a multimedia server and the search engine is to receive the search request from a client computer via a network.

21. An apparatus as recited in claim 18, wherein the apparatus comprises a multimedia server and the search engine is to determine whether any of the multimedia data streams satisfy the search criteria by forwarding the search criteria to an index server.

22. An apparatus as recited in claim 18, wherein the apparatus comprises a client computer and the search engine is to receive a search request from a user of the client computer.

23. An apparatus as recited in claim 18, further comprising an index storing index data, wherein the apparatus is to determine whether any of the multimedia data streams satisfy the search criteria by comparing, for each of the multimedia data streams, the search criteria to index data for the multimedia data stream.

24. An apparatus as recited in claim 18, wherein each of the multimedia data streams contain data wherein the apparatus is to determine whether any of the multimedia data streams satisfy the search criteria by comparing for each of the multimedia data streams, the search criteria to the data of the multimedia data stream.

25. An apparatus as recited in claim 18, wherein:
the search engine is to identify a temporal location of the multimedia data streams that satisfies the search criteria and forward the temporal location to the streaming component; and
the streaming component is to stream the multimedia data streams to the client computer at a beginning temporal location based on the identified temporal location.

26. An apparatus as recited in claim 18, wherein the apparatus further comprises a data saving component to receive the multimedia data streams from a multimedia server and store the multimedia data streams in the memory device.

27. A system comprising:
a client computer, coupled to a network, to receive streaming data via the network; and
a multimedia server, coupled to the network, to stream the streaming data to the client computer, the multimedia server including one or more index files corresponding to the streaming data and a search engine to check whether data in the index files matches search criteria received from the client computer, wherein the multimedia server is to stream at least a portion of the streaming data in response to the streaming data satisfying search criteria received from the client computer.

28. A system as recited in claim 25, wherein the client computer comprises a demultiplexer to separate the streaming data into individual media streams, and a data saver to save the individual media streams at the client computer.

29. A system comprising:
a client computer, coupled to a network, to receive streaming data via the network;
a multimedia sever, coupled to the network to stream to streaming data to the client computer, and
an index server, coupled to the network, to store index files corresponding to the streaming data and to check, upon receipt of a search request, whether any portion of the streaming data matches search criteria of the search request based at least in part on the contents of the index files, wherein in response to a portion of the streaming data matching the search criteria, the multimedia server is to stream at least a portion of the streaming data to the client computer.

30. A method comprising:
identifying a set of search criteria to be compared to data of a streaming media presentation;
transmitting the set of search criteria to a server; and
receiving an indication of whether the search criteria match any portion of the streaming media presentation, wherein the indication comprises streaming of at least a portion of the streaming multimedia presentation in response to the search criteria matching a portion of the streaming media presentation.

31. A method recited in claim 30, wherein the indication comprises streaming of the streaming media presentation beginning at a temporal location corresponding to a portion of the streaming media presentation that matches the search criteria.

32. A method as recited in claim 28, wherein the transmitting comprises transmitting the set of search criteria to an index server.

33. A method as recited in claim 28, comprising storing the streaming media presentation locally.

34. One or more computer-readable memories containing a computer program that is executable by a processor to perform the method recited in claim 30.

35. A method comprising:
receiving a plurality of media streams as streaming data from a multimedia server;
storing the received plurality of media streams locally;
generating a markup document describing how the plurality of media streams are to be presented and referencing the locally stored plurality of media streams; and
selectively playing back at least one of the stored plurality of media streams locally.

36. A method as recited in claim 35, wherein the receiving the plurality of media streams comprises receiving the plurality of streams as a composite media stream.

37. A method as recited in claim 35, wherein the generating comprises:
receiving, from the multimedia server, an original markup document referencing the plurality of media streams stored at the multimedia server, and
modifying the original markup document to reference the plurality of locally stored media streams rather than the plurality of media streams stored at the multimedia server.

38. A method as recited in claim 35, further comprising:
receiving a search request with search criteria; and accessing the locally stored plurality of media streams to determine whether the search criteria is satisfied by a portion of the plurality of media streams.

39. A method as recited in claim 35, further comprising:
receiving a plurality of index files corresponding to the plurality of media streams, and
storing the plurality of index files locally.

40. A method according to claim 39, further comprising searching the index files in response to a request during the playing back.

41. One or more computer-readable memories containing a computer program that is executable by a processor to perform the method recited in claim 35.

42. One or more computer-readable media having stored thereon a computer program that, when executed by one or more processors, causes the one or more processors to perform functions including:
receiving a markup document, from a multimedia server, that references a plurality of multimedia data streams at one or more remote media servers, and that identifies how the plurality of multimedia data streams are to be presented at a client computer;

receiving the plurality of multimedia data streams from the one or more remote media servers;

storing the plurality of multimedia data streams locally at the client computer;

selectively playing back at least one of the stored plurality of media streams at the client computer;

modifying the markup document to reference the plurality of locally stored multimedia data streams rather than the plurality of remotely stored multimedia data streams; and storing the modified markup document.

43. One or more computer-readable media as recited in claim 42, wherein the computer program further causes the one or more processors to perform functions including subsequently using the modified markup document to present the plurality of locally stored multimedia data streams at the client computer.

44. One or more computer-readable media as recited in claim 42, wherein the computer program further causes the one or more processors to perform functions including combining the plurality of locally stored multimedia data streams and the modified markup document into a common location.

45. One or more computer-readable media as recited in claim 42, wherein the computer program further causes the one or more processors to perform functions including:

receiving a plurality of index files corresponding to the plurality of multimedia data streams; and storing the plurality of index files locally at the client computer.

46. One or more computer-readable media as recited in claim 45, wherein the computer program further causes the one or more processors to perform functions including:

receiving a search request from a user;

checking the plurality of locally stored index files to determine whether any portion of the locally stored multimedia data streams correspond to the search request; and indicating to the user whether any portion of the locally stored multimedia data streams correspond to the search request.

47. A method according to claim 46, wherein the indicating occurs during the playing back.

* * * * *